United States Patent [19]

Tabata

[11] 4,110,025

[45] Aug. 29, 1978

[54] DUPLEX ELECTROSTATIC COPYING MACHINE

[75] Inventor: Yasuhiro Tabata, Tokyo, Japan

[73] Assignee: Ricoh Company, Ltd., Tokyo, Japan

[21] Appl. No.: 723,274

[22] Filed: Sep. 15, 1976

[30] Foreign Application Priority Data

Sep. 22, 1975 [JP] Japan ................................ 50-114554

[51] Int. Cl.² ...................... G03G 15/00; G03B 27/32; G03B 27/52

[52] U.S. Cl. ........................... 355/3 SH; 271/DIG. 9; 271/277; 355/3 TR; 355/24

[58] Field of Search .................. 355/3 R, 3 SH, 3 TR, 355/23, 24, 25; 271/65, 186, 204, 277, DIG. 9

[56] References Cited

U.S. PATENT DOCUMENTS 3,227,444 1/1966 Egan .................................. 355/23 X
3,615,129 10/1971 Drawe et al. ....................... 355/25 X
3,797,929 3/1974 Deacon et al. ...................... 355/3 R
3,980,406 9/1976 Lang ...................................... 355/24

*Primary Examiner*—Fred L. Braun
*Attorney, Agent, or Firm*—Frank J. Jordan

[57] ABSTRACT

A chain rotates adjacent to and at the same speed as a photoconductive drum and first and second clamps fixed to the chain grip the edges of copy sheets to move the copy sheets in synchronized contact with the drum for toner image transfer from the drum to the sheets. The first clamp grips an edge of a copy sheet for transfer of an image to the front side of the copy sheet. A turnover actuator and feed roller pair then release the first clamp and move the copy sheet away from the chain. As the second clamp approaches the actuator, it is opened thereby and the feed roller pair feeds the copy sheet back toward the chain so that the opposite edge of the copy sheet is gripped by the second clamp. The copy sheet is thereby turned over and conveyed by the chain to the drum for transfer of a toner image to the back side thereof.

8 Claims, 7 Drawing Figures

DUPLEX ELECTROSTATIC COPYING MACHINE

BACKGROUND OF THE INVENTION

The present invention relates to a duplex electrostatic copying machine.

Duplex copying machines which form images on both sides of copy sheets have been recently devised and some have been placed on sale. However, these copying machines generally suffer from defects that the images on the opposite sides of the sheet are not in register with each other in the vertical direction of the sheet. This is caused by inaccurate sheet feed timing, especially during the formation of the second image on the back side of the sheets.

These duplex copying machines further suffer from the drawbacks that they are complicated in construction and therefore expensive to manufacture on a commercial basis. Some of these machines comprise two optical systems and two photoconductive drums or the like for forming the images on the opposite sides of the copy sheets. This duplication of basic components unnecessarily increases the cost of the copying machines.

Other forms of duplex copying machines comprise only one optical system and drum, but complicated mechanisms for turning the copy sheets over for image transfers to the front and back sides of the sheets. In addition, large space is required for the sheet turnover mechanisms, which means that the copying machines must be of excessively large overall size.

SUMMARY OF THE INVENTION

It is an object of the present invention to provide a duplex copying machine which provides images on opposite sides of copying sheets in proper register.

It is another object of the present invention to provide a duplex copying machine featuring a sheet turnover mechanism which is simple in construction, small in size and effective in operation.

It is another object of the present invention to provide a duplex copying machine comprising a chain movable adjacent to a photoconductive drum, first and second clamps for attaching copy sheets to the chain for movement thereby in contact with the drum for transfer of toner images to opposite sides of the sheet and actuator and feed means to release a first edge of the sheet from the first clamp after image transfer to the front side of the sheet and attach a second and opposite edge of the sheet to the second clamp for image transfer to the back side of the sheet.

It is another object of the present invention to provide a generally improved duplex copying machine.

Other objects, together with the foregoing, are attained in the embodiment described in the following description and illustrated in the accompanying drawings.

DESCRIPTION OF THE PREFERRED EMBODIMENT

While the duplex copying machine of the invention is susceptible of numerous physical embodiments, depending upon the environment and requirements of use, substantial numbers of the herein shown and described embodiment have been made, tested and used, and all have performed in an eminently satisfactory manner.

Figure 1:
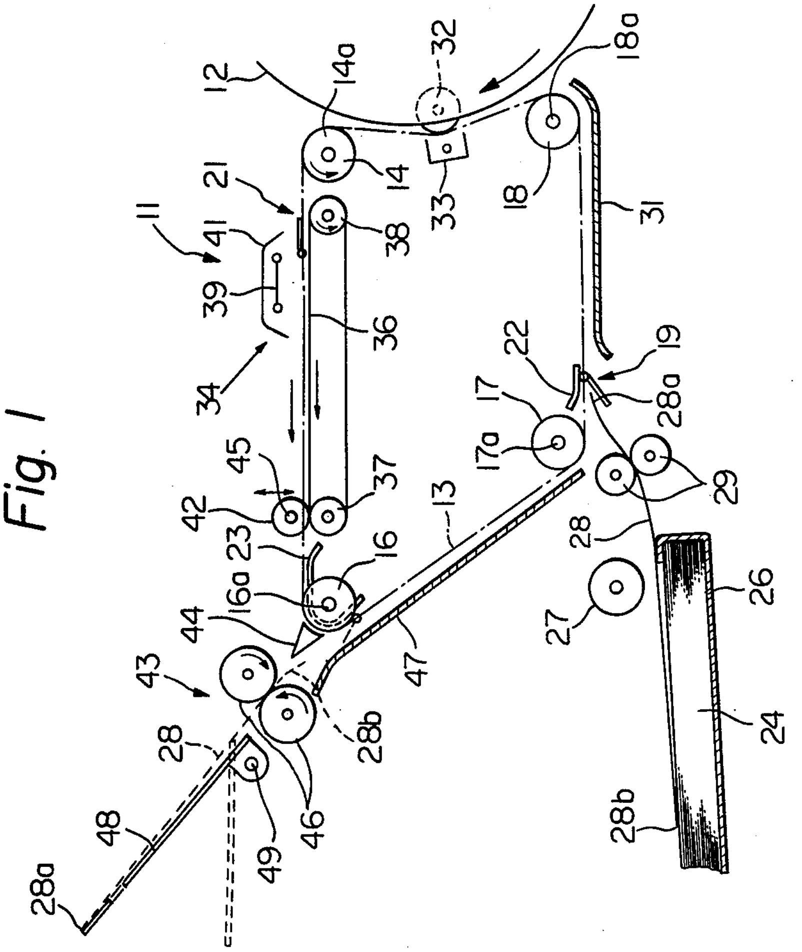
FIG. 1 is a plan view of a duplex copying machine embodying the present invention.
Figure 2:
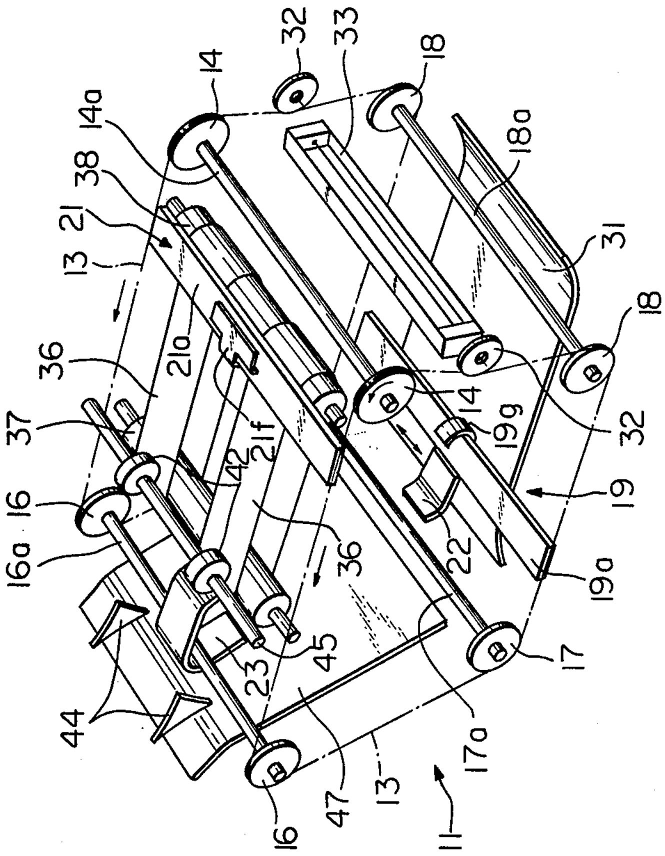
FIG. 2 is a perspective view of the duplex copying machine.

Referring now to FIGS. 1 and 2, a duplex copying machine embodying the present invention is generally designated as 11 and comprises a rotary drum 12 formed with a photoconductive peripheral surface (not designated). The drum 12 is driven for rotation by drive means (not shown) in the clockwise direction in FIG. 1 at constant speed. Although not shown, an optical system such as that disclosed in our U.S. Pat. No. 3,869,202 is provided to form an electrostatic image on the drum 12 and a developing unit applies a toner substance to the drum 12 to develop the electrostatic image into a visible toner image. A pair of identical conveyor chains, both of which are designated as 13, are trained around sprockets 14, 16, 17 and 18 which are mounted for unitary rotation on shafts 14*a*, 16*a*, 17*a* and 18*a* respectively. The shaft 14*a* is driven by drive means (not shown) counterclockwise so that the chains 13 and sprockets 14, 16, 17 and 18 are also driven for counterclockwise rotation. The drive speed of the shaft 14*a* is selected so that the chains 13 move at a speed equal to the surface speed of the drum 12, and the portions of the chains 13 between the sprockets 18 and 14 are disposed closely adjacent to the drum 12.

Figure 3:
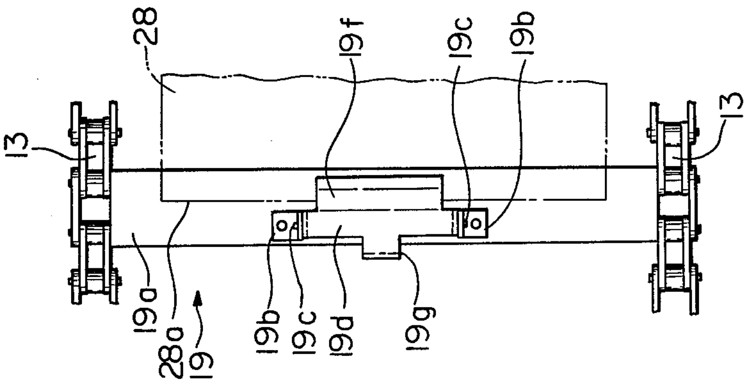
FIG. 3 is an overhead view showing a chain and clamp of the copying machine.
Figure 4:
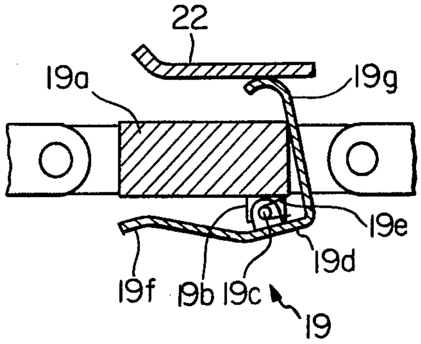
FIG. 4 is a fragmentary plan view showing a clamp in a released or open position.
Figure 5:
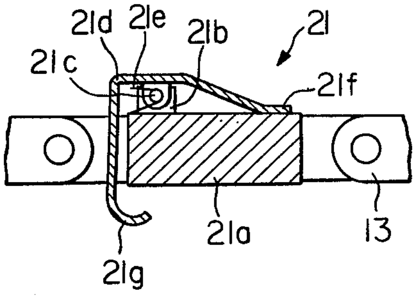
FIG. 5 is a fragmentary plan view showing a clamp in a clamping position.

First and second clamps 19 and 21 are fixed to the chains 13 as illustrated in FIGS. 3 and 4, which show the clamps 19. The clamp 19 comprises a rectangular clamp plate 19*a* which is connected at its opposite ends to the chains 13. Brackets 19*b* are fixed to the clamp plate 19 and formed with holes (not designated) through which rotatably extend pins 19*c* fixed to the opposite ends of a clamp jaw 19*d* in such a manner as to rotatably support the jaw 19*d*. The jaw 19*d* is generally L-shaped and is biased clockwise in FIG. 4 by a wire spring 19*e* to press a gripping end 19*f* thereof against the plate 19*a*. The opposite or actuating end 19*g* of the jaw 19*d* extends above the plate 19*a* as viewed in FIG. 4 and is curved inwardly. The clamp 21 is shown in FIG. 5 and comprises a clamp plate 21*a*, brackets 21*b*, pins 21*c*, a jaw 21*d*, a wire spring 21*e*, a gripping end 21*f* and an actuating end 21*g*. The clamp 21 is identical to the clamp 19 except that the actuating end 19*g* of the first clamp 19 is longer than the actuating end 21*g* of the second clamp 21.

As shown in FIGS. 1 and 2 an actuator member 22 is fixedly provided adjacent to the chains 13 slightly downstream of the sprockets 17 in the direction of rotation of the chains 13 and another actuator member 23 is fixedly provided so as to extend around the shaft 16*a*. The actuating end 19*g* is arranged to engage with the actuator member 22 as the clamp 19 moves past the actuator member 22 as illustrated in FIG. 4 so that the jaw 19*d* is rotated counterclockwise against the force of the spring 19*e* and the gripping end 19*f* moves away from the clamp plate 19*a* thereby releasing or opening the clamp 19. The clamp 19 is similarly opened through engagement with the actuator member 23 as is the clamp 21. However, the actuator member 22 is spaced farther from the path of the chains 13 than is the actuator member 23. It will be recalled that the actuating end 19*g* of the clamp 19 is longer than the actuating end 21*g* of the clamp 21. The spacing is selected so that both of the clamps 19 and 21 are opened while in engagment with the actuator member 23 but only the clamp 19 is opened while in engagement with the actuator member 22.

A stack 24 of copy sheets is provided in a cassette 26 and a pickup roller 27 is disposed above the stack 24 to pick up and feed a top sheet which is designated as 28 into the bite of a pair of feed rollers 29. The sheet 28 is rectangular and has first and second opposite edges 28*a* and 28*b* respectively which define the top and bottom of the sheet 28. The feed rollers 29 are driven in synchronization by drive means (not shown) at a speed slightly higher than the speed of the chains 13 to feed the edge 28*a* of the sheet 28 into the bite of the clamp 19 between the clamp plate 19*a* and the gripping end 19*f* of the jaw 19*d* when the actuating end 19*g* engages with the actuating member 22 to open the clamp 19. As the actuating end 19*g* disengages from the actuator member 22, the clamp 19 is closed to grip the end 28*a* of the copy sheet 28 and attach the copy sheet 28 to the chains 13 for unitary movement. A guide plate 31 is provided below the portion of the chains 13 between the sprockets 17 and 18 to guide the movement of the sheet 28.

Tension sprockets 32 engage with the chains 13 between the sprockets 18 and 14 to serve the dual purpose of taking up any slack in the chains 13 and positioning the chains 13 slightly away from the surface of the drum 12 so that the clamps 19 and 21 clear the drum 12. A corona discharge transfer unit 33 is disposed adjacent to and facing the drum 12.

A fixing unit 34 comprises conveyor belts 36 trained around drive rollers 37 and 38 and a heat source 39 mounted above the conveyor belt 36 in a reflector 41. The fixing unit 34 is provided between the sprockets 14 and 16 in such a manner that the upper runs of the belts 36 are slightly below the chains 13. Furthermore, the conveyor belts 36 are driven counterclockwise so that the upper runs thereof move in the same direction and at the same speed as the chains 13. Idler rollers 42 rotatably mounted on a shaft 45 are provided above the roller 37 as will be described in detail below.

A sheet turnover unit 43 comprises a pair of guide members 44 and a pair of reversible feed rollers 46 mounted to the left of the guide members 44 in FIG. 1. A guide plate 47 is provided adjacent to the chains 13 between the feed rollers 46 and the sprockets 17. A tiltable table 48 is tiltably mounted by means of a shaft 49 to the left of the feed rollers 46 so as to be tiltable between a horizontal position shown in phantom line and a tilted position shown in solid line.

The circumferential length of the drum 12 is selected to be slightly greater than the length of the largest copy sheet which the copying machine 11 is designed to accomodate. The length of the chains 13 is equal to exactly twice the circumference of the drum 12. The clamps 19 and 21 are equally spaced along the length of the chains 13 by a distance which is equal to the circumference of the drum 12. Although not shown, a gear system or the like is provided which couples the drive shaft 14*a* for the chains 13 and the drive shaft (not shown) for the drum 12 together so that as the clamps 19 and 21 reach the position of the sprockets 18 the leading edge of a toner image on the drum 12 also reaches the position of the sprockets 18.

The operation of the copying machine 11 will become clear from the following description.

The copying machine 11 is designed to print or form copy images on both sides of copy sheets, the copy sheet 28 being considered for descriptive purposes. To form a copy image on the front of the sheet 28, the machine operator places an original document to be copied on a transparent platen and pushes a button (not shown). The optical system forms an electrostatic image of the document on the drum 12 and the developing unit applies a toner substance to the drum 12 to develop the electrostatic image into a visible toner image. As the leading edge of the toner image on the drum 12 reaches a predetermined position upstream of the sprockets 18, the rollers 27 and 29 are actuated by synchronization means (not shown) to feed the sheet 28 to the clamp 19. The rollers 27 and 29 are synchronized such that the clamp 19 is opened by the actuator member 22 just as the edge 28*a* of the copy sheet 28 reaches the clamp 19. As the clamp 19 disengages from the actuator member 22, the clamp 19 is closed to grip the edge 28*a* of the copy sheet 28 and carry the sheet 28 therewith. As the clamp 19 and thereby the edge 28*a* of the sheet 28 reach the position of the sprockets 18, the leading edge of the toner image on the drum 12 also reaches said position. The sheet 28 then engages with the drum 12 so as to move in contact therewith between the positions of the sprockets 18 and 14. The transfer unit 33 applies an electrostatic field to the back of the sheet 28 of a polarity to attract the toner substance thereto and transfer the toner image to the sheet 28. As the sheet 28 subsequently moves under the heat source 39, the toner substance is melted and fused to the sheet 28 so that the toner image is permanently thermally fixed to the sheet 28. During the fixing operation, the sheet 28 is supported by the conveyor belts 36 which move at the same speed as the chains 13.

The idler rollers 42 are controlled to be normally raised to positions above the conveyor belts 36 respectively, although not shown, so that the clamps 19 and 21 may pass thereunderneath. However, after the clamp 19 passes under the rollers 42, the rollers 42 are lowered to press the sheet 28 between the rollers 42 and the conveyor belts 36 and feed the sheet 28 leftwardly in FIG. 1 in conjunction with the drive roller 37. As the clamp 19 engages with the actuator member 23, the clamp 19 is opened and the end 28*a* of the sheet 28 is released. The clamp 19 is carried around the sprockets 16 along with the chains 13, but the sheet 28 is guided by the guide members 44 into the bite of the feed rollers 46.

Figure 6:
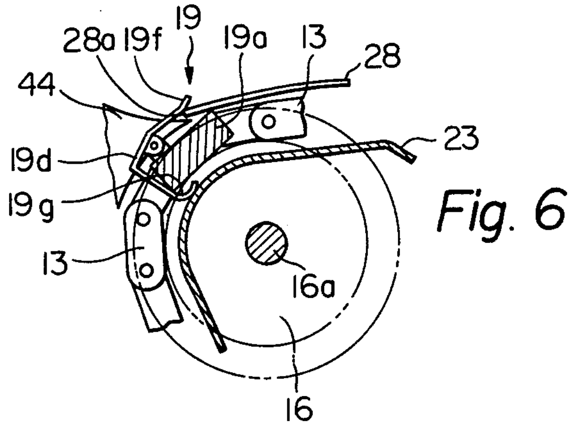
FIG. 6 is a fragmentary plan view showing a first clamp releasing a copy sheet after toner image transfer to the front side thereof.

The feed rollers 46 at this stage of operation are driven to rotate in directions indicated by arrows to feed the sheet 28 upwardly and leftwardly onto the table 48 which is tilted as shown in solid line. The feed rollers 46 are stopped when the sheet 28 reaches a phantom line position in which the edge 28*a*, which entered the bite of the feed rollers 46 first, is spaced from the chains 13 to a maximum extent. The opposite edge 28*b* of the sheet 28 is now closest to the chains 13. The idler rollers 42 are moved to their inoperative positions above the conveyor belts 36 when the sheet 28 reaches this position. The operation of the sheet 28 being released by the clamp 19 and being guided by the guide members 44 to the feed rollers 46 is particularly illustrated in FIG. 6.

Figure 7:
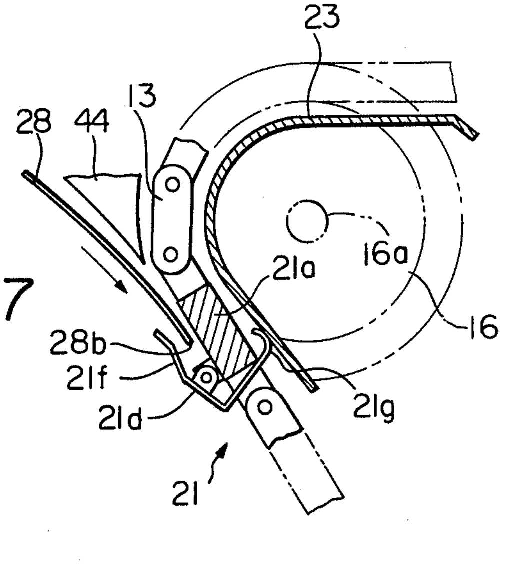
FIG. 7 is similar to FIG. 6 but shows the sheet being moved into clamping engagement with a second clamp in preparation for toner image transfer to the back side of the sheet.

As the clamp 21 engages with and is opened by the actuator member 23, the feed rollers 46 are energized to drive in the opposite direction thereby feeding the sheet 28 back toward the chains 13. The edge **28*b* of the sheet 28 is guided by the guide members 44 into the clamp 21 just as the clamp 21 starts to disengage from the actuator member 23. The rollers 46 feed the sheet 28 at a speed which is slightly faster than that of the chains 13 so that the edge 28*b* of the sheet 28 is gripped by the clamp 21 as the clamp 21 closes. This operation is particularly illustrated in FIG. 7**.

It will be understood that whereas during the first toner image transfer operation in which the edge **28*a* of the sheet 28 is gripped by the clamp 19 the front side of the sheet 28 faces outwardly from the chains 13 to receive the toner image from the drum 12, with the edge 28*b* gripped by the clamp 21 the sheet 28 is turned over so that the back side of the sheet 28** faces outwardly.

To copy another document on the back side of the sheet 28, the operator places the document on the platen and pushes the button again. An electrostatic image of the second document is thereby formed on the drum 12 and developed to form a toner image. As the leading edge of the toner image on the drum 12 and the clamp 21, and thereby the edge **28*b* of the sheet 28, reach the position of the sprockets 18, the sheet 28 is again moved in contact with the drum 12 to transfer the second toner image to the back side of the sheet 28. The heat source 39 fixes the second toner image to the back side of the sheet 28 and is designed not to melt the first toner image on the front side of the sheet 28**.

As the clamp 21 clears the rollers 42, the clamp 21 is opened by the actuator member 23 and the rollers 42 are lowered to feed the sheet 28 to the feed rollers 46 as described above. For the second transfer operation the table 48 is lowered to the horizontal position and the rollers 46 are not stopped until the sheet 28 is fed completely therebetween and discharged onto the table 48. In summary, two documents are copied onto the front and back sides of the copy sheet 28 respectively and the sheet 28 is discharged onto the table 48 for use.

The copying machine 11 may of course be adapted to selectively copy on only one side of a sheet. In this case, a mode switch and control means (not shown) are provided to discharge the sheet 28 onto the table 48 which is moved to the horizontal position after the first transfer operation. More specifically, the mode switch is provided with single and double print positions. In the double print position, the copying machine 11 copies on both sides of the sheet 28 as described in detail above. In the single print position, the table 48 is moved to the horizontal position before the clamp 19 reaches the actuator member 23 following the first transfer operation in which the sheet 28 is gripped by the clamp 19. As the sheet 28 is released by the clamp 19, the rollers 42 are lowered to feed the sheet 28 to the feed rollers 46 which are adapted to drive until the sheet 28 is discharged therefrom onto the table 48.

The copying machine 11 may also be adapted to provide multiple copies of a single document at twice the speed of the copying operations described above. In this case, the actuating ends **19*g* and 21*g* of the clamps 19 and 21 respectively are adapted to have the same length. The actuator member 22 is adapted to be movable into and out of the path of the actuating ends 19*g* and 21*g*** respectively.

For the double copying operation, suitable control means are provided to move the actuator member 22 out of the path of the clamp 21 as the clamp 21 approaches the actuator member 22 so that only the clamp 19 is opened by the actuator member 22 in the same manner as described above. For the single copying operation, it is irrelevant whether or not the clamp 21 is opened by the actuator member 22.

However, for a multiple copying operation at double speed, the actuator member 22 is positioned so as to open both clamps 19 and 21 while in engagement therewith. The drum 12 is imaged and the resulting electrostatic image developed to produce a toner image for each revolution of the drum 12. In addition, a sheet is fed from the stack 24 to either clamp 19 or 21 as the clamp 19 or 21 is opened by the actuator member 22. In this manner, a copy is produced for each revolution of the drum 12 and two copies are produced for each revolution of the chains 13.

The particular embodiment of the copying machine 11 herein shown and described, while preferred, is exemplary and may be modified in a number of ways depending upon the particular application. For example, the fixing unit 34 may be replaced by a pressure fixing unit, although not illustrated. If the control means for the copying machine 11 comprises a sensor (not shown) to determine when the edge **28*b* of the sheet 28 reaches the position illustrated in phantom line with the sheet 28 gripped by the feed rollers 46, the copy machine 11 can clearly accomodate copy sheets of any length. The clamps 19 and 21 may be provided with more than one jaw 19*d* to grip the sheet 28 in a more stable manner. The corona discharge transfer unit 33 may be replaced by a roller or the like to produce toner image transfer. The drum 12 may be replaced by an endless belt formed with a photoconductive surface and which may have a circumferential length equal to any integral multiple of the distance between the clamps 19 and 21. High speed, multiple copying operations are facilitated by the fact that the drum 12 and the chains 13 are driven continuously, thereby eliminating any time which would be lost in intermittently stopping the drum 12 and/or chains 13**.

In summary, it will be understood from the above description that the present duplex copying machine 11 efficiently provides copies on both sides of copy sheets utilizing a simple and compact mechanism. Perfect register of the images on the front and back sides of the sheets are assured since the sheets are fed into the clamps 19 and 21 slightly faster than the speed of the clamps 19 and 21.

Many other modifications to the preferred embodiment herein shown and described within the scope of the invention will become possible for those skilled in the art after receiving the teachings of the present disclosure.

What is claimed is:

1. In a duplex electrostatic copying apparatus comprising a moving photoconductive member, means for forming toner images on the photoconductive member, conveyor means for moving a rectangular copy sheet into synchronized engagement with the photoconductive member to transfer toner images thereto, and turnover means associated with the conveyor means in such a manner as to detach the copy sheet from the conveyor means after a toner image is formed on a front side of the copy sheet, turn over the copy sheet and reattach the copy sheet to the conveyor means for transfer of a toner image to a back side of the copy sheet, the improvement wherein the conveyor means comprises:

a moving endless chain; and first and second spaced releasable clamps fixed to the chain for movement therewith, the first clamp clamping a first edge of the copy sheet to the chain to form the toner image on the front side of the copy sheet, the second clamp clamping a second edge of the copy sheet which is opposite to the first edge to the chain to form the toner image on the back side of the copy sheet;

the turnover means comprising:

actuator means having an actuator member engageable with the first and second clamps to cause the first clamp to release the first edge of the copy sheet to detach the copy sheet from the chain and the second clamp to clamp the second edge of the copy sheet to reattach the copy sheet to the chain; and feed means to engage with and move the copy sheet, when the first clamp engages with the actuator member and is actuated thereby to release the first edge of the copy sheet, away from the chain to a position in which the second edge of the copy sheet is clear of the chain and to move the copy sheet back toward the chain when the second clamp engages with the actuator member so that the second edge of the copy sheet is clamped by the second clamp when the second clamp disengages from the actuator member.

2. An apparatus as in claim 1, further comprising feed means to feed the copy sheet to the conveyor means for attachment thereto.

3. An apparatus as in claim 1, in which the feed means comprises a pair of reversible feed rollers and a guide member for guiding the first edge of the copy sheet from the first clamp to the feed rollers and for guiding the second edge of the copy sheet from the feed rollers to the second clamp.

4. An apparatus as in claim 3, in which the turnover means further comprises a tiltable table provided downstream of the feed rollers and being tiltable between a tilted position to cooperate with the guide member to guide the second edge of the copy sheet from the feed rollers to the second clamp after the toner image is transferred to the front side of the copy sheet and a substantially horizontal position to receive the copy sheet from the feed rollers after the toner image is transferred to the back side of the copy sheet.

5. An apparatus as in claim 1, in which the photoconductive member is formed with an endless photoconductive surface which is greater in circumference than the copy sheet is in length between the first and second edges, the chain having a length equal to twice the circumference of the photoconductive member and the first and second clamps being spaced from each other by a distance equal to the circumference of the photoconductive member along the chain.

6. An apparatus as in claim 1, further comprising sheet feed means to feed the copy sheet to the first clamp for attachment to the chain, the sheet feed means comprising a sheet feed actuator member, the chain being movable adjacent to the sheet feed actuator member so that the first clamp is engageable with the sheet feed actuator member to be actuated thereby to open while in engagement with the sheet feed actuator member, the sheet feed means further comprising a sheet feed roller for feeding the copy sheet to the first clamp so that the first edge of the copy sheet is clamped by the first clamp upon disengagement of the first clamp from the sheet feed actuator member.

7. An apparatus as in claim 1, further comprising toner image fixing means disposed adjacent to the chain between the photoconductive member and the actuator means for fixing toner images to the copy sheet.

8. An apparatus as in claim 7, in which the toner image fixing means comprises a conveyor belt having an upper surface moving at the same speed and in the same direction as the chain, the conveyor belt moving the copy sheet to the feed means after the copy sheet is released by the clamp means.

* * * * *